US012689743B2

(12) United States Patent
Thompson et al.

(10) Patent No.: US 12,689,743 B2
(45) Date of Patent: Jul. 21, 2026

(54) VIDEO DECODING USING A NOISE-BASED EFFECT REFERENCE VALUE RECONSTRUCTION

(71) Applicant: ADVANCED MICRO DEVICES, INC., Santa Clara, CA (US)

(72) Inventors: Mark Thompson, Cambridge (GB); Jonathan Philip Bonsor-Matthews, Cambridge (GB)

(73) Assignee: Advanced Micro Devices, Inc., Santa Clara, CA (US)

( * ) Notice: Subject to any disclaimer, the term of this patent is extended or adjusted under 35 U.S.C. 154(b) by 135 days.

(21) Appl. No.: 18/206,056

(22) Filed: Jun. 5, 2023

(65) Prior Publication Data
US 2024/0406416 A1 Dec. 5, 2024

(51) Int. Cl.
*H04N 19/172* (2014.01)

(52) U.S. Cl.
CPC .................................. *H04N 19/172* (2014.11)

(58) Field of Classification Search
CPC .............................. H04N 19/172; H04N 19/85
See application file for complete search history.

(56) References Cited

U.S. PATENT DOCUMENTS

| | | | | |
|---|---|---|---|---|
| 11,197,008 B2* | 12/2021 | Li | ........................ | H04N 19/172 |
| 2007/0047658 A1* | 3/2007 | Tourapis | .................. | H04N 5/21 |
| | | | | 348/E5.077 |
| 2014/0037202 A1* | 2/2014 | Choudhury | ............... | G06T 5/70 |
| | | | | 382/172 |
| 2018/0302640 A1* | 10/2018 | Li | ........................ | H04N 19/117 |
| 2019/0066272 A1* | 2/2019 | Norkin | ..................... | G06T 3/20 |
| 2019/0174139 A1* | 6/2019 | Yang | ..................... | H04N 19/192 |
| 2020/0084460 A1* | 3/2020 | Li | ........................ | H04N 19/14 |
| 2020/0175724 A1* | 6/2020 | Rossato | ................. | H04N 19/46 |
| 2021/0092459 A1* | 3/2021 | Cheong | ................. | H04N 19/82 |
| 2021/0241429 A1* | 8/2021 | Pan | ........................... | G06T 5/20 |
| 2022/0191501 A1* | 6/2022 | Guionnet | ............. | H04N 19/136 |
| 2023/0016432 A1* | 1/2023 | Sjöberg | ................. | H04N 19/85 |
| 2023/0059035 A1* | 2/2023 | Moorthy | ............... | H04N 19/52 |
| 2023/0120553 A1* | 4/2023 | Izadi | ..................... | H04N 19/85 |
| | | | | 375/240.26 |
| 2023/0388556 A1* | 11/2023 | Sole Rojals | ......... | G06V 10/751 |
| 2024/0098309 A1* | 3/2024 | Dabbadi | .............. | H04N 19/182 |

OTHER PUBLICATIONS

Rivaz, Peter De et al., "AV1 Bitstream & Decoding Process Specification", Alliance for Open Media, 2018, 681 pages.

* cited by examiner

*Primary Examiner* — Richard A Hansell, Jr.

(57) ABSTRACT

A processing unit (PU) is configured to generate reference values based on previously displayed frames in order to decode encoded frames having one or more noise-based effects. To this end, the PU includes a noise effect circuitry configured to determine noise values associated with a previously displayed frame. The noise effect circuitry then subtracts respective noise values from the pixel values of the previously displayed frame to determine reference values for decoding an encoded frame. Further, the PU includes a decoder that decodes the encoded frame based on the determined reference values.

20 Claims, 6 Drawing Sheets

VIDEO DECODING USING A NOISE-BASED EFFECT REFERENCE VALUE RECONSTRUCTION

BACKGROUND

To display a frame having a noise-based effect such as film-grain, dithering, debanding, and the like, some processing systems are configured to first perform a denoising operation on the frame to remove the noise-based effect. The processing systems also encode the denoised frame and determine one or more noise effect parameters based on a difference between the frame having the noise-based effect and the denoised frame. The processing systems then send an encoded bit stream including the encoded frame and the noise effect parameters to a decoder of a device associated with the user. Upon receiving the encoded bitstream, the decoder of the device is configured to decode the encoded frame. Additionally, the decoder of the device is configured to determine values of a noise-based effect to apply to the decoded frame based on the received noise effect parameters. To this end, the device performs one or more noise generation algorithms using the noise effect parameters to determine values of a noise-based effect to apply to the decoded frame. After determining such values of a noise-based effect, the decoder applies the values to the decoded frame and presents the frame with the noise-based effect to the user.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Figure 1:
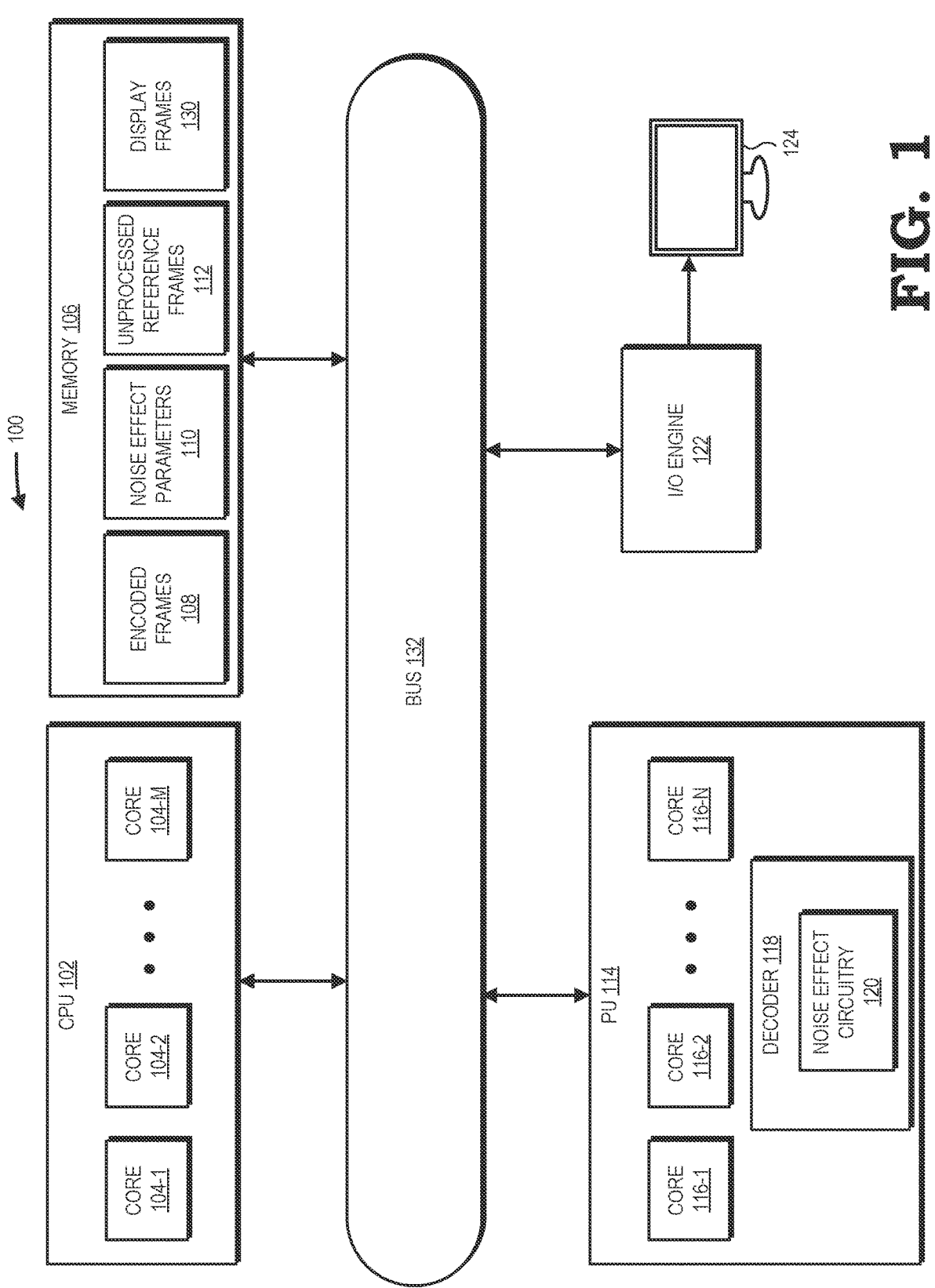
FIG. 1 is a block diagram of a processing system configured for generating reference values based on previously displayed frames, in accordance with some embodiments.

Some processing systems are configured to display one or more frames to a user that include a noise-based effect. Such a noise-based effect, for example, includes the processing system applying one or more noise values to one or more pixel values of a frame. To display these frames having a noise-based effect, these processing systems are first configured to receive an encoded bitstream (e.g., from a network, bus, or the like) that includes one or more noise effect parameters and one or more encoded frames. Such noise-based effect parameters, for example, include data indicating one or more values (e.g., constants) to be used in one or more noise-based effect estimation algorithms, noise-based effect synthesis algorithms, noise-based effect modeling algorithms, or any combination thereof. Further, such encoded frames include compressed data representing the pixel values of frames to be displayed. To decode these encoded frames, such processing systems include a processing unit (PU) that includes a decoder and noise effect circuitry. When decoding an encoded frame with a noise-based effect, the decoder of the PU is configured to decode an encoded frame according to one or more codecs (e.g., AOMedia Video 1 (AV1), VP9, H.264 (Advanced Video Coding (AVC), H.265 (High Efficiency Video Coding (HEVC), H.266 (Versatile Video Coding (VVC)). For example, the decoder is configured to receive an encoded bit stream including one or more encoded frames. The decoder then decodes a first encoded frame of the encoded bitstream according to a codec to produce a decoded frame having uncompressed pixel values without a noise-based effect applied (e.g., without any noise values applied to the uncompressed pixel values). The decoder then stores the decoded frame having uncompressed pixel values as an unprocessed reference frame that is used to decode one or more subsequent encoded frames.

Further, when decoding an encoded frame with a noise-based effect, the noise effect circuitry of the PU is configured to determine one or more noise values based on the noise effect parameters included in the encoded bitstream. As an example, the noise effect circuitry performs one or more noise effect estimation algorithms, noise effect synthesis algorithms, noise effect modeling algorithms, or any combination thereof associated with a codec (e.g., the codec used to decode the encoded frame) using the noise effect parameters (e.g., the values indicated in the noise effect parameters). After the noise values are determined, the decoder of the PU applies respective noise values to each uncompressed pixel value of the decoded frame to generate a display frame with a noise-based effect. The display frame with a noise-based effect is then stored in the memory and subsequently displayed to the user. In this way, when decoding an encoded frame with a noise-based effect, the decoder stores two frames in the memory-a frame to be displayed (e.g., display frame with a noise-based effect) that includes the noise values (e.g., a noise-based effect) and a second reference frame (e.g., unprocessed reference frame) that includes the uncompressed pixel values of the frame without any noise values (e.g., without a noise-based effect applied).

Storing both the display frame and an unprocessed reference frame when decoding an encoded frame, however, increases the processing resources needed to decode the encoded frame. For example, storing both the display frame and an unprocessed reference frame when decoding an encoded frame increases the memory bandwidth and power consumption required to decode an encoded frame. To this end, techniques and systems disclosed herein are directed to generating reference values based on a previously displayed frame. For example, a processing system configured for generating reference values based on a previously displayed frame includes a memory and a PU coupled to the memory that includes a decoder and noise effect circuitry. To decode a current encoded frame with a noise-based effect, the noise effect circuitry of the PU is configured to first determine the noise values (e.g., a noise-based effect) applied to a previously displayed frame (e.g., the most recently displayed frame). As an example, the noise effect circuitry performs one or more noise-based effect estimation algorithms, noise-based effect synthesis algorithms, noise-based effect modeling algorithms, or any combination thereof associated with a codec using one or more noise effect parameters indicated in the encoded bitstream to determine one or more noise values applied to a most recently displayed frame. Based on the noise values applied to the previously displayed frame, the noise effect circuitry then determines one or more reference values representing the pixel values of the previously displayed frame without a noise-based effect applied. For example, the noise effect circuitry subtracts the determined noise values from the pixel values of the previously displayed frame to determine the reference values. The decoder then combines the reference values with the encoded frame to determine the uncompressed pixel values of the frame to be displayed.

Additionally, the noise effect circuitry is configured to perform one or more noise-based effect estimation algorithms, noise-based effect synthesis algorithms, noise-based effect modeling algorithms, or any combination thereof using the noise effect parameters indicated in the encoded bitstream to determine one or more noise values to apply to the uncompressed pixel values of the frame to be displayed. After determining these noise values and the uncompressed pixel values of the frame to be displayed, the decoder applies respective noise values to each uncompressed pixel value to generate a display frame with a noise-based effect (e.g., a frame to be displayed with a noise-based effect). The decoder then stores the display frame with a noise-based effect in the memory. In this way, the processing system only stores a frame to be displayed (e.g., display frame with a noise-based effect) in the memory instead of storing both a display frame and an unprocessed reference frame (e.g., frame with the noise-based effect applied). Because the unprocessed reference frame is not also stored in the memory, the memory bandwidth and power consumption required to decode an encoded frame are decreased, increasing the processing efficiency of the processing system.

However, some processing systems clamp the pixel values of a display frame such that the pixel values of the display frame are within a pixel value range that includes a minimum pixel value and a maximum pixel value. In cases where the pixel value of a previously displayed frame was above the maximum pixel value of the pixel value range before being clamped or the pixel value of a previously displayed frame was below the minimum pixel value of the pixel value range before being clamped, an exact reference value cannot be determined by subtracting a determined noise value from the pixel values of the previously displayed frame. That is to say, when the pixel value of a previously displayed frame includes an exceptional value (e.g., a pixel value outside of the pixel value range before being clamped), the noise effect circuitry cannot determine an exact reference value by subtracting a determined noise value from the clamped pixel value of the previously displayed frame.

To help facilitate these exceptional values, some processing systems are configured to generate offset values when decoding an encoded frame. For example, when decoding an encoded frame, in response to the display pixel data (e.g., the sum of uncompressed pixel data and noise values) of a pixel of the display frame being greater than the maximum pixel value of a pixel value range or less than the minimum pixel value range, the decoder generates an offset value that includes the difference between the pixel data and the maximum pixel value of a pixel value range or the minimum pixel value of a pixel value range, respectively. When decoding a subsequent encoded frame, the noise effect circuitry then uses these offset values to determine reference values for each pixel of the most recently displayed frame having a pixel value equal to the minimum pixel value of the pixel value range, a pixel value equal to the maximum pixel value of the pixel value range, or both. In this way, the processing system accommodates such exceptional values while still not requiring a reference frame to be saved to the memory, reducing the memory bandwidth and power consumption needed to decode an encoded frame.

Alternatively, to help facilitate these exceptional values, some processing systems are configured to store reference values for pixels of a display frame having exceptional values in an exceptional value frame stored in the memory. For example, when decoding an encoded frame, in response to the display pixel value (e.g., the sum of the uncompressed pixel data and noise values) of a pixel of a frame being greater than the maximum pixel value of a pixel value range or less than the minimum pixel value of the pixel value range, the decoder stores a value (e.g., exceptional value) representing the uncompressed pixel data (the display pixel data without noise values applied) in an exceptional frame data. When decoding a subsequent encoded frame, the PU then uses the reference values in the exceptional value frame to determine reference values for each pixel of the most recently displayed frame having a pixel value equal to the minimum pixel value of the pixel value range, a pixel value equal to the maximum pixel value of the pixel value range, or both. In this way, the exceptional value frame only includes reference values for pixels of a display frame having exceptional values (e.g., pixel values outside of the pixel value range) and thus includes less data (e.g., is smaller in size) than a reference frame that includes all the pixel values of a frame without a noise-based effect. Because the exceptional value frame includes less data, the processing system accommodates such exceptional values while still reducing the amount of data saved to the memory, reducing the memory bandwidth and power consumption needed to decode an encoded frame.

As used herein, the term "circuitry" includes hardwired circuitry, programmable circuitry, or a combination thereof. For example, circuitry may include circuitry of an application-specific integrated circuit (ASIC) that is hardwired or hardcoded to perform corresponding functions, one or more processors that execute software stored in one or more memories or other storage media to perform corresponding functions, programmable logic that has been programmed to perform corresponding functions, or some combination thereof.

Referring now to FIG. 1, a processing system 100 configured for generating reference values based on previously displayed frames is presented, in accordance with some embodiments. The processing system 100 includes or has access to a memory 106 or other storage component implemented using a non-transitory computer-readable medium, for example, a dynamic random-access memory (DRAM). However, in implementations, the memory 106 is implemented using other types of memory including, for example, static random-access memory (SRAM), nonvolatile RAM, and the like. According to implementations, the memory 106 includes an external memory implemented external to the processing units implemented in the processing system 100. The processing system 100 also includes a bus 132 to support communication between entities implemented in the processing system 100, such as the memory 106. Some implementations of the processing system 100 include other buses, bridges, switches, routers, and the like, which are not shown in FIG. 1 in the interest of clarity.

The techniques described herein are, in different implementations, employed at processing unit (PU) 114. PU 114 includes, for example, vector processors, coprocessors, graphics processing units (GPUs), general-purpose GPUs (GPGPUs), accelerated processing units (APUs), non-scalar processors, highly parallel processors, artificial intelligence (AI) processors, inference engines, machine learning processors, other multithreaded processing units, scalar processors, serial processors, or any combination thereof. In embodiments, PU 114 is configured to decode an encoded bitstream to display one or more frames on a display 124, to store in a storage (not shown for clarity) of the processing system 100, or both. For example, in embodiments, processing system 100 is configured to receive (e.g., via a network, bus 132, or both) an encoded bitstream that includes one or more encoded frames 108. Such encoded frames 108, for example, each includes a frame encoded according to a codec (e.g., AV1, VP9, AVC, HEVC, VVC) that includes compressed pixel values for the frame. According to some embodiments, such an encoded bitstream includes one or more encoded blocks that together form one or more encoded frames 108. In embodiments, processing system 100 is configured to store one or more encoded frames 108 from an encoded bitstream in memory 106. To decode these encoded frames 108, PU 114 includes a decoder 118 that includes circuitry configured to decode one or more encoded frames 108 according to a codec (e.g., the same codec used to encode the encoded frames 108). As an example, decoder 118 is configured to combine an encoded frame 108 with one or more reference frames to determine a decoded frame having uncompressed pixel values. In embodiments, PU 114 includes one or more processor cores 116 configured to support decoder 118 by performing, concurrently or in parallel, one or more instructions, operations, or both on behalf of decoder 118. That is to say, one or more processor cores 116 perform one or more instructions, operations, or both necessary for, assisting in, or helpful for decoder 118 decoding an encoded frame 108. According to implementations, one or more processor cores 116 operate as SIMD units that perform the same operation on different data sets. Though in the example implementation illustrated in FIG. 1, three processor cores (116-1, 116-2, 116-N) are presented representing an N number of cores, the number of processor cores 116 implemented in the PU 114 is a matter of design choice. As such, in other implementations, the PU 114 can include any number of processor cores 116.

In embodiments, PU 114 is configured to decode an encoded bitstream, for example, to display one or more display frames 130 having a noise-based effect on display 124. According to some embodiments, a noise-based effect is a post-processing effect likely to cause interference with motion prediction performed by a decoder (e.g., decoder 118). As an example, a noise-based effect includes film grain, dithering, debanding, and the like. To apply a noise-based effect to a frame, for example, processing system 100 is configured to apply one or more respective noise values to each unprocessed pixel values of a frame. An unprocessed pixel value, for example, includes one or more uncompressed pixel values without one or more noise-based effects applied. In some embodiments, the encoded bit stream received by processing system 100 includes one or more noise effect parameters 110 in addition to one or more encoded frames 108. These noise effect parameters 110, for example, include data indicating one or more values (e.g., constants) to be used in one or more noise-based effect estimation algorithms, noise-based effect synthesis algorithms, noise-based effect modeling algorithms, or any combination thereof associated with a codec (e.g., the codec used to encode encoded frames 108) to determine one or more noise values for a noise-based effect.

For a first encoded frame 108 of the encoded bitstream, the decoder 118 of the PU 114 combines the first encoded frame 108 with an unprocessed reference frame 112 stored in memory 106, included in the received encoded bitstream, or both, according to a codec (e.g., the codec used to encode the first encoded frame 108). The unprocessed reference frame 112, for example, includes an initial frame, previously displayed frame, or both without a noise-based effect applied to the frame (e.g., without noise values applied to the pixel values of the unprocessed reference frame 112). Based on the first encoded frame 108 and the unprocessed reference frame 112, decoder 118 determines one or more uncompressed pixel values for a frame. For example, decoder 118 combines the pixel values of the first encoded frame 108 with pixel values of the unprocessed reference frame 112 to determine one or more uncompressed pixel values for a frame. Further, in embodiments, the decoder 118 stores a frame having these uncompressed pixel values (e.g., pixel values without a noise-based effect applied) in memory 106 as an unprocessed reference frame 112 used to decode one or more subsequent encoded frames 108.

To determine the noise values of a noise-based effect to apply to the uncompressed pixel values, PU 114 includes noise effect circuitry 120. Noise effect circuitry 120, for example, includes circuitry configured to determine one or more noise values based on one or more noise effect parameters 110. As an example, noise effect circuitry 120 is configured to perform one or more noise effect (e.g., film grain, dithering, debanding) estimation algorithms, noise effect (e.g., film grain, dithering, debanding) synthesis algorithms, noise effect (e.g., film grain, dithering, debanding) modeling algorithms, or any combination thereof associated with a codec (e.g., the codec used to encode encoded frames 108) using one or more a noise effect parameters 110 to determine one or more noise values. According to some embodiments, one or more processor cores 116 of PU 114 are configured to perform one or more instructions, operations, or both on behalf of noise effect circuitry 120. As an example, one or more processor cores 116 of PU 114 are configured to perform one or more instructions, operations, or both necessary for, aiding in, or helpful for determining one or more noise values. After noise effect circuitry 120 determines these noise values, the decoder 118 of the PU 114 then applies respective noise values to one or more uncompressed pixel values determined by the decoder 118 to determine one or more display pixel values. Further, according to some embodiments, the decoder 118 clamps the resulting display pixel values such that the display pixel values are within a display pixel range that includes a minimum pixel value and a maximum pixel value. The decoder 118 determines such a pixel range, for example, based on a bit-range associated with the display frames 130. For example, in response to the display frames 130 being associated with an 8-bit range (e.g., full range), the decoder 118 determines a pixel range having a minimum pixel value of 0 and a maximum pixel value of 255. The decoder 118 then stores a frame with the clamped display pixel values (sum of the uncompressed pixel values and noise values) as a display frame 130 in memory 106. Such a display frame 130, for example, represents a frame to be displayed on display 124 that includes a noise-based effect (e.g., film grain, dithering, debanding).

However, generating display frames 130 in this way requires decoder 118 to store both an unprocessed reference frame 112 and display frame 130 in memory 106 when decoding an encoded frame 108. Because both an unprocessed reference frame 112 and display frame 130 are stored in memory 106, the processing resources of processing system 100 needed to decode an encoded frame 108 are increased. For example, storing both the display frame 130 and an unprocessed reference frame 112 when decoding an encoded frame 108 increases the memory bandwidth and power consumption required for decoder 118 to decode an encoded frame 108. To this end, in embodiments, PU 114 is configured to decode an encoded frame 108 using reference values generated based on previously displayed display frames 130. For example, to decode an encoded frame 108, noise effect circuitry 120 of PU 114 is first configured to determine one or more noise values (e.g., a noise-based effect) that were applied to one or more previously displayed display frames 130. As an example, noise effect circuitry 120 generates one or more noise values that were applied to the display frame 130 most recently displayed on display 124. To generate such noise values, noise effect circuitry 120 performs one or more noise effect estimation algorithms, noise effect synthesis algorithms, noise effect modeling algorithms, or any combination thereof associated with a codec (e.g., the codec used to decode the encoded frame 108) using the noise effect parameters 110. Noise effect circuitry 120 then subtracts respective determined noise values from the pixel values of the most recently displayed display frame 130 to generate one or more reference values. Such reference values, for example, represent the pixel values of one or more previously displayed display frames 130 without a noise-based effect (e.g., noise values) applied. The decoder 118 then combines these reference values with the encoded frame 108 (e.g., the compressed pixel values in the encoded frame 108) to determine one or more uncompressed pixel values. Noise effect circuitry 120 then determines one or more noise values to apply to the uncompressed pixel values by, for example, performing one or more noise effect estimate algorithms, noise effect synthesis algorithms, noise effect modeling algorithms, or any combination thereof associated with a codec (e.g., the codec used to decode the encoded frame 108) using the noise effect parameters 110. The decoder 118 adds respective determined noise values to the uncompressed pixel values to produce a display frame 130 with a noise-based effect applied which is subsequently saved in memory 106.

In this way, the PU 114 only stores a display frame 130 (e.g., a frame to be displayed with a noise-based effect on display 124) in memory 106 instead of storing both a display frame 130 and an unprocessed reference frame 112. Because the unprocessed reference frame 112 is not also stored in memory 106, the memory bandwidth and power consumption required by decoder 118 to decode an encoded frame 108 are decreased, increasing the processing efficiency of the processing system 100. However, in some embodiments, noise effect circuitry 120 cannot determine an exact reference value from a previously displayed display frame 130. As an example, some display frames 130 include exceptional values that were clamped to be equal to the maximum pixel value or minimum pixel value of a pixel value range associated with the display frames 130. Such exceptional values, for example, include display pixel data (e.g., a sum of uncompressed pixel values and noise values) that are greater than the maximum pixel value of a pixel value range associated with the display frames 130 or less than the minimum pixel value of a pixel value range associated with the display frames 130. Because these exceptional values were clamped when they were stored in the display frame 130, the actual pixel value (e.g., a sum of uncompressed pixel values and noise values) is unknown to noise effect circuitry 120 when pixel values are read from the display frame 130. Due to the actual pixel value being unknown, noise effect circuitry 120 cannot determine an exact reference value from the clamped exceptional value and instead determines a range of potential reference values.

To help avoid cases where noise effect circuitry 120 determines a range of potential reference values, PU 114 is configured to accommodate exceptional values in the display frames 130 that are subsequently clamped. For example, in some embodiments, when decoding an encoded frame 108, decoder 118 determines a respective display pixel value (e.g., a sum of uncompressed pixel values and noise values) for each pixel of a display frame 130. In response to a display pixel value being greater than a predetermined maximum pixel value threshold (e.g., the top pixel value in the range of pixel values associated with the display frames 130), a display pixel value being less than a predetermined minimum pixel value threshold (e.g., the bottom pixel value in the range of pixel values associated with the display frames 130), or both, decoder 118 is configured to generate one or more offset values. These offset values, for example, indicate the difference between the display pixel value and the maximum pixel value threshold, between the display pixel value and the minimum pixel threshold value, or both. According to some embodiments, decoder 118 stores such offsets with the clamped display pixel data in a frame such that a resulting display frame 130 includes one or more display pixel values with a noise-based effect applied and one or more offsets. When decoding a subsequent encoded frame 108, in some embodiments, noise effect circuitry 120 is configured to determine reference values from a most recently displayed display frame 130 based on one or more offsets. As an example, for each display pixel value of a display frame 130 associated with an offset, noise effect circuitry 120 is configured to first determine an unadjusted reference value by subtracting a respective noise value from the display pixel data. Noise effect circuitry 120 then applies an offset to the unadjusted reference value to generate a reference value.

As another example, to help accommodate such exceptional values, when decoding an encoded frame 108, decoder 118 first determines the display pixel values (e.g., the sum of uncompressed pixel data and noise values) for each pixel of a display frame 130. In response to a display pixel value of a pixel including an exceptional value (e.g., a value greater than a predetermined maximum pixel value threshold or a value less than a predetermined minimum pixel value threshold), decoder 118 is configured to store the uncompressed pixel data value (e.g., display pixel value without noise values applied) of the pixel in an exceptional value frame. Such an exceptional value frame, for example, includes a frame including uncompressed pixel data (e.g., reference values) of pixels of a display frame 130 having an exceptional value before being clamped. When decoding a subsequent encoded frame 108, in some embodiments, noise effect circuitry 120 is configured to determine reference values from a most recently displayed display frame 130 using the exceptional value frame. For example, in response to the pixel value of a pixel of the most recently displayed display frame 130 being equal to the maximum pixel value of the pixel value range, or the pixel value of a pixel of the most recently displayed display frame 130 being equal to the minimum pixel value of the pixel value range, noise effect circuitry 120 determines a reference value based on a value associated with the pixel stored in the exceptional value frame. In response to the pixel value of a pixel and pixel value of a pixel of the most recently displayed display frame 130 being between the minimum pixel value and the maximum pixel value of the range, noise effect circuitry 120 determines a reference value by subtracting a respective noise value from the pixel value. In this way, the exceptional value frame only includes reference values for pixels of a display frame 130 with exceptional values (e.g., values outside the pixel value range associated with the display frames 130) and thus includes less data (e.g., is smaller in size) than an unprocessed reference frame 112 that includes all the pixel values of a frame without a noise-based effect. Because the exceptional value frame includes less data, the processing system accommodates such exceptional values while still reducing the amount of data saved to the memory, reducing the memory bandwidth and power consumption needed to decode an encoded frame.

In embodiments, the processing system 100 also includes a central processing unit (CPU) 102 that is connected to the bus 132 and therefore communicates with the PU 114 and the memory 106 via the bus 132. The CPU 102 implements a plurality of processor cores 104-1 to 104-N that execute instructions concurrently or in parallel. In implementations, one or more of the processor cores 104 operate as SIMD units that perform the same operation on different data sets. Though in the example implementation illustrated in FIG. 1, three processor cores (104-1, 104-2, 104-M) are presented representing an M number of cores, the number of processor cores 104 implemented in the CPU 102 is a matter of design choice. As such, in other implementations, the CPU 102 can include any number of processor cores 104. In some implementations, the CPU 102 and PU 114 have an equal number of processor cores 104, 116 while in other implementations, the CPU 102 and PU 114 have a different number of processor cores 104, 116. The processor cores 104 execute instructions for one or more applications stored in the memory 106 and the CPU 102 stores information in the memory 106 such as the results of the executed instructions.

According to embodiments, processing system 100 further includes an input/output (I/O) engine 122. The I/O engine 122 includes hardware and software to handle input or output operations associated with the display 124, as well as other elements of the processing system 100 such as keyboards, mice, printers, external disks, and the like. The I/O engine 122 is coupled to the bus 132 so that the I/O engine 122 communicates with the memory 106, the PU 114, or the CPU 102.

Figures 2, 3:
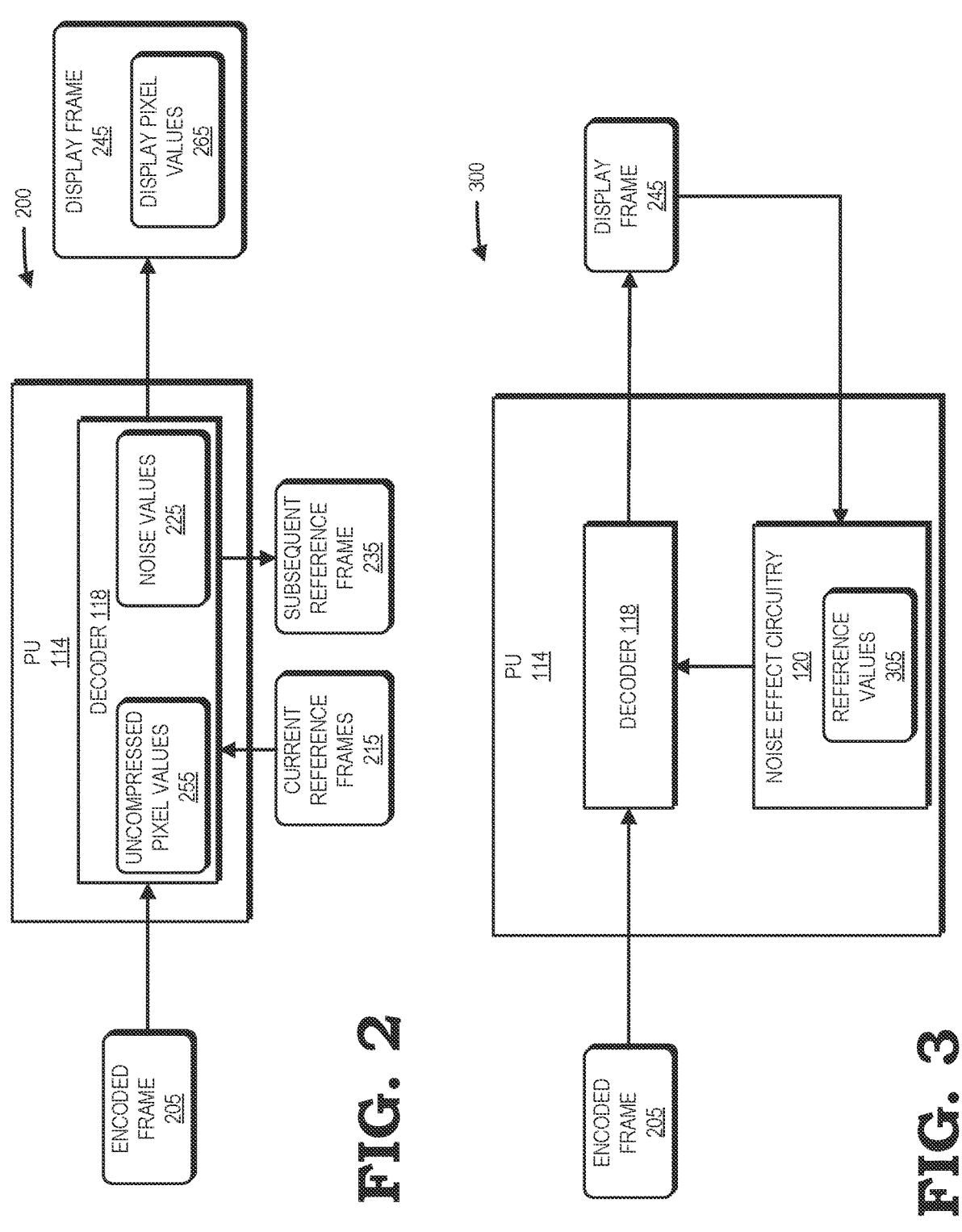
FIG. 2 is a flow diagram of an example operation for decoding a display frame with a noise-based effect, in accordance with some embodiments.
FIG. 3 is a flow diagram of an example operation for decoding a display frame with a noise-based effect by generating reference values based on previously displayed frames, in accordance with some embodiments.

Referring now to FIG. 2, an example operation 200 for decoding a display frame with a noise-based effect (e.g., film grain, dithering, debanding) is presented, in accordance with some embodiments. In embodiments, example operation 200 includes decoder 118 receiving an encoded frame 205, similar to or the same as encoded frame 108. Further, example operation 200 includes decoder 118 decoding encoded frame 205 by first retrieving one or more current reference frames 215 from memory 106. A current reference frame 215, for example, includes one or more reference values (e.g., pixel values without a noise-based effect applied) associated with a previously displayed display frame 130, reference values indicated in a received encoded bitstream, or both. Based on one or more current reference frames 215, decoder 118 then determines one or more uncompressed pixel values 255 of a frame according to a codec (e.g., AV1, VP9, AVC, HEVC, VVC). As an example, decoder 118, according to a codec (e.g., the codec used to encode encoded frame 205), combines one or more compressed (e.g., encoded) pixel values of a first block of encoded frame 205 to respective reference values in a first block of the current reference frame 215 to determine a block of one or more uncompressed pixel values 255. Further, decoder 118 generates a subsequent reference frame 235 based on the determined uncompressed pixel values 255. The subsequent reference frame 235, for example, includes a frame with pixel values without any noise values 225 (e.g., a noise-based effect) applied to the pixel values. In this way, the subsequent reference frame 235 represents a display frame 130 to be displayed (e.g., the display frame 130 generated from decoding encoded frame 205) without a noise-based effect (e.g., noise values 225) applied. After generating the subsequent reference frame 235, decoder 118 stores the subsequent reference frame 235 in memory 106. Further, in embodiments, decoder 118 is configured to decode one or more subsequent encoded frames 108 (e.g., a second encoded frame) using the subsequent reference frame 235.

Concurrently with decoder 118 determining such uncompressed pixel values 255, noise effect circuitry 120 (not shown for clarity) is configured to generate one or more noise values 225 to apply to the uncompressed pixel values. To this end, noise effect circuitry 120 is configured to perform one or more noise effect (e.g., film grain, dithering, debanding) estimation algorithms, a noise effect synthesis algorithms, noise effect modeling algorithms, or any combination thereof associated with a codec (e.g., the codec associated with decoder 118, the codec used to encode encoded frame 205). For example, noise effect circuitry 120 performs one or more noise effect estimation algorithms, noise effect synthesis algorithms, noise effect modeling algorithms, or any combination thereof using one or more noise effect parameters 110 received from an encoded bitstream to generate noise values 225. In response to noise effect circuitry 120 determining noise values 225, decoder 118 then adds respective noise values 225 to one or more uncompressed pixel values 255 to produce display pixel values 265. That is to say, decoder 118 applies a noise-based effect to the uncompressed pixel values 255 by adding respective noise values 225 to one or more uncompressed pixel values 255 to produce display pixel values 265.

Based on the display pixel values 265 (e.g., the sum of the uncompressed pixel values 255 and noise values 225), decoder 118 generates display frame 245, similar to or the same as a display frame 130, that represents a frame to be displayed that includes the display pixel values 265 (e.g., pixel values with a noise-based effect applied). Decoder 118 then stores the display frame 245 in memory 106. In some embodiments, decoder 118 is configured to clamp one or more display pixel values 265 before they are stored in display frame 245. For example, decoder 118 is configured to clamp display pixel values 265 such that each display pixel value 265 is within one or more pixel ranges associated with the display frame 245. A pixel range, for example, is based on a bit-range associated with the display frame 245 and includes a minimum pixel value and a maximum pixel value. As an example, based on display frame 245 being associated with an 8-bit range (e.g., full range), a resulting pixel value range includes a minimum pixel value of 0 and a maximum pixel value of 255. According to embodiments, decoder 118 is configured to clamp one or more display pixel values 265 using the following equation:

$$P=\text{clamp(ref+noise, min pixel value, max pixel value)} \qquad \text{[EQ01]}$$

Wherein P represents a display pixel value 265, ref represents an uncompressed pixel value 255 (e.g., reference value), noise represents a noise value 225, min pixel value represents the minimum pixel value of a pixel value range associated with display frame 245, and max pixel value represents the maximum pixel value of a pixel value range associated with display frame 245.

However, using example operation 200 to decode an encoded frame 205 requires decoder 118 to store both subsequent reference frame 235 and display frame 245 in memory 106. Because both a subsequent reference frame 235 and display frame 245 are stored in memory 106, the processing resources needed for decoder 118 to decode an encoded frame 205 are increased. To this end, FIG. 3 presents an example operation 300 for decoding a display frame with a noise-based effect (e.g., film grain, dithering, debanding) by generating reference values based on one or more previously displayed frames. For example, in embodiments, example operation 300 first includes noise effect circuitry 120 determining one or more reference values 305 from a previously displayed display frame 130. For example, noise effect circuitry 120 determines reference values 305 based on a most recently displayed display frame 130. The reference values 305, for example, represent the display pixel values 265 of a previously displayed display frame 130 without a noise-based effect (e.g., noise values 225) applied. To determine reference values 305, noise effect circuitry 120 is configured to perform one or more noise effect estimation algorithms, noise effect synthesis algorithms, noise effect modeling algorithms, or any combination thereof to determine the noise values (e.g., the noise-based effect) applied to the pixel values of the most recently displayed display frame 130. For example, noise effect circuitry 120 performs, according to a codec associated with decoder 118 (e.g., the codec used to decode encoded frame 205), one or more noise effect estimation algorithms, noise effect synthesis algorithms, noise effect modeling algorithms, or any combination thereof using one or more noise effect parameters 110 received from an encoded bit stream. After determining these noise values, noise effect circuitry 120 then determines the reference values 305 based on the determined noise values. As an example, in some embodiments, noise effect circuitry 120 is configured to determine one or more reference values 305 by subtracting the determined noise values from the display pixel values 265 of a previously displayed display frame 130.

After noise effect circuitry 120 determines reference values 305, decoder 118 then combines the reference values 305 with pixel values in encoded frame 205 to determine uncompressed pixel values 255. As an example, based on a codec (e.g., the codec used to encode encoded frame 205), decoder 118 combines each reference value 305 with respective pixel values in encoded frame 205 to determine uncompressed pixel values 255. Further, concurrently with decoder 118 generating uncompressed pixel values 255, noise effect circuitry 120 is configured to generate one or more noise values 225 to apply to the uncompressed pixel values 255. As an example, noise effect circuitry 120 performs one or more noise effect estimation algorithms, noise effect synthesis algorithms, noise effect modeling algorithms, or any combination thereof using one or more noise effect parameters 110 received from an encoded bitstream to generate noise values 225. In response to noise effect circuitry 120 determining noise values 225, decoder 118 then adds respective noise values 225 to one or more uncompressed pixel values 255 to generate display frame 245 and stores display frame 245 in memory 106. Additionally, in embodiments, noise effect circuitry 120 is configured to generate a second set of reference values 305 used to decode a subsequent (e.g., second) encoded frame based on display frame 245. In this way, PU 114 is configured to generate reference values 305 based on previously displayed display frame 130. As such, the PU 114 only stores a display frame 245 rather than storing a display frame 245 and subsequent reference frame 235, reducing the memory bandwidth and power consumption required by decoder 118 to decode an encoded frame 108.

Within example operation 300, some instances arise where noise effect circuitry 120 cannot determine an exact value for a reference value 305 by subtracting determined noise values from display pixel values 265 of a display frame 130, 245. For example, in some embodiments, decoder 118 determines one or more display pixel values 265 that each include an exceptional value. Such an exceptional value, for example, includes a value that is less than the minimum pixel value of the pixel value range associated with the display frame 130, 245 or a value that is greater than the maximum pixel value of the pixel value range associated with the display frame 130, 245. Before storing these display pixel values 265 to produce a display frame 130, 245, according to some embodiments, decoder 118 is configured to first clamp the display pixel values 265 such that each display pixel value is within a respective pixel value range (e.g., is between the minimum pixel value of the range and the maximum pixel value of the range). In this way, display pixel values 265 having an exceptional value that exceeds the maximum pixel value (e.g., exceeds a maximum pixel value threshold) are clamped such that the display pixel values 265 have a clamped value equal to the maximum pixel value. Likewise, display pixel values 265 having an exceptional value that is less than the minimum pixel value (e.g., is less than a minimum pixel value threshold) are clamped such that the display pixel values 265 have a clamped value equal to the minimum pixel value. As such, these clamped display pixel values 265 of a display frame 130, 245 do not indicate the actual value (e.g., exceptional value) associated with the pixel. Because the clamped display pixel values 265 do not indicate the actual value of the pixel, noise effect circuitry 120 cannot determine an exact reference value 305 from these clamped display pixel values 265. Rather, for example, based on a clamped display pixel value 265, noise effect circuitry 120 subtracts a noise value from the clamped display pixel value 265 to determine a range of potential reference values due to the actual display pixel value 265 being unknown.

To this end, FIGS. 4-9 present systems and techniques for accommodating display pixel values 265 having exceptional values (e.g., values greater than a maximum pixel value of a pixel value range associated with a display frame 130, 245 or less than a minimum pixel value of a pixel value range associated with a display frame 130, 245). As an example, referring now to FIG. 4, an example operation 400 for generating an exceptional value frame to store exceptional values is presented. According to embodiments, example operation 400 is implemented in example operation 300 by at least a portion of processing system 100. Example operation 400 first includes a decoder 118 decoding an encoded frame 405 similar to or the same as an encoded frame 108.

For example, according to some embodiments, decoder 118 is configured to decode the encoded frame 405 as described in example operation 300. While decoding encoded frame 405, decoder 118 is configured to generate one or more display pixel values. For example, based on the encoded frame and one or more reference values 305, decoder 118 is configured to determine one or more uncompressed pixel values 255. Additionally, noise effect circuitry 120 is configured to generate one or more noise values 225 based on, for example, one or more noise effect parameters 110. Decoder 118 then adds one or more respective noise values 225 to each uncompressed pixel value 255 to generate display pixel values 415, similar to or the same as display pixel values 265.

After determining display pixel values 415, decoder 118 then determines an exceptional value frame 425 based on the display pixel value 415. For example, for each display pixel value 415 having a value (e.g., exceptional value) equal to or greater than a maximum pixel value of a pixel value range associated with display frames 130 or equal to or less than a minimum pixel value of a pixel value range associated with display frames 130, decoder 118 stores an exceptional reference value in exceptional value frame 425. Such an exceptional reference value, for example, represents a display pixel value 415 having an exceptional value without a noise-based effect (e.g., a respective noise value 225) applied to the display pixel value 415. For example, to determine an exceptional reference value, decoder 118 subtracts a respective noise value 225 from a display pixel value 415 having an exceptional value. In this way, decoder 118 generates an exceptional value frame 425 that only includes reference values (e.g., exceptional reference values) for pixels having a display pixel value 415 with an exceptional value (e.g., a value greater than a maximum pixel value of a pixel value range associated with display frames 130 or less than a minimum pixel value of a pixel value range associated with display frames 130). Once exceptional value frame 425 is generated, decoder 118 stores the exceptional value frame in memory 106. Further, decoder 118 clamps each display pixel value 415 such that each display pixel value 415 is with the pixel value range associated with the display frames 130. That is to say, each display pixel value 415 is between a minimum pixel value and a maximum pixel value associated with the range. Decoder 118 then generates display frame 435, similar to or the same as display frames 130, based on the clamped display pixel values 415 such that display frame 435 includes a respective clamped display pixel value 415 for each pixel of display frame 435. After generating display frame 435, decoder 118 stores display frame 435 in memory 106.

Further, when decoder 118 is decoding a second encoded frame, noise effect circuitry 120 is configured to determine one or more reference values 445 based on display frame 435 (e.g., a previously displayed display frame). To this end, for each pixel value of each block of display frame 435, noise effect circuitry 120 determines whether a pixel value is equal to a minimum pixel value of a range of pixel values associated with the display frames 130 or equal to a maximum pixel value of a range of pixel values associated with the display frames 130. In response to a pixel value of display frame 435 being equal to the minimum pixel value or maximum pixel value of the range, noise effect circuitry 120 determines a reference value 445, similar to or the same as reference values 305, based on exceptional value frame 425. For example, noise effect circuitry 120 identifies a value associated with the pixel in exceptional value frame 425 and generates a reference value 445 equal to the identified value. In response to a pixel value of display frame 435 being between the minimum pixel value or maximum pixel value of the range, noise effect circuitry 120 determines a reference value 445 for the pixel by subtracting a respective noise value from the pixel value of the pixel.

Figures 4, 5:
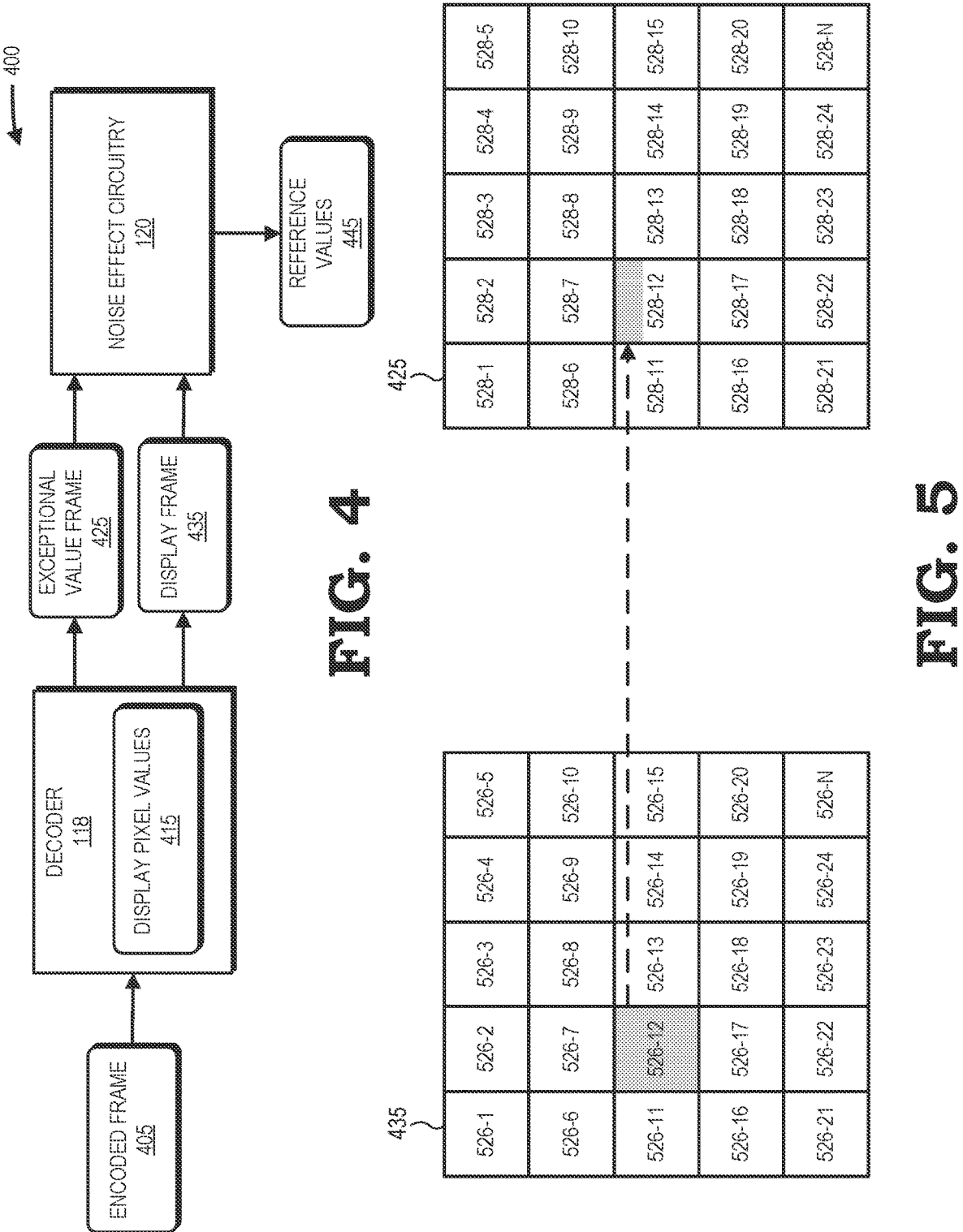
FIG. 4 is a flow diagram of an example operation for generating an exceptional value frame to store exceptional values, in accordance with some embodiments.
FIG. 5 is a diagram of an example exceptional value frame, in accordance with some embodiments.

In this way, decoder 118 generates an exceptional value frame 425 that only includes reference values for pixels of a display frame 435 having exceptional values (e.g., pixel values outside of the pixel value range) and thus includes less data (e.g., is smaller in size) than a reference frame that includes all the pixel values of a frame without a noise-based effect. For example, referring now to FIG. 5, an example exceptional value frame 425 associated with a display frame 435. In embodiments, display frame 435 includes one or more blocks 526 each storing display pixel values 415 (e.g., clamped display pixel values 415) for each pixel in the block. Though the example embodiment presented in FIG. 5 shows display frame 435 with 25 blocks (526-1, 526-2, 526-3, 526-4, 526-5, 526-6, 526-7, 526-8, 526-9, 526-10, 526-11, 526-12, 526-13, 526-14, 526-15, 526-16, 526-17, 526-18, 526-19, 526-20, 526-21, 526-22, 526-23, 526-24, 526-N) representing an N number of blocks, in other embodiments, display frame 435 can include any number of blocks. According to embodiments, display frame 435 is associated with exceptional value frame 425 generated, for example, concurrently with display frame 435. Exceptional value frame 425 includes one or more blocks 528 each storing exceptional reference values (e.g., reference values 445) for each pixel of display frame 435 that had an exceptional value (e.g., a value equal to greater than a maximum pixel value of a pixel range or equal to or less than the minimum pixel value of a pixel range) before being clamped. Though the example embodiment presented in FIG. 5 shows exceptional value frame 425 with 25 blocks (528-1, 528-2, 528-3, 528-4, 528-5, 528-6, 528-7, 528-8, 528-9, 528-10, 528-11, 528-12, 528-13, 528-14, 528-15, 528-16, 528-17, 528-18, 528-19, 528-20, 528-21, 528-22, 528-23, 528-24, 528-N) representing an N number of blocks, in other embodiments, exceptional value frame 425 can include any number of blocks.

Because exceptional value frame 425 only includes exceptional reference values (e.g., reference values 445) for each pixel of display frame 435 that had an exceptional value before being clamped, exceptional value frame 425 includes less data than a display frame 435, unprocessed reference frame 112, or both. For example, in embodiments, block 528-12 of exceptional value frame 425 includes exceptional reference values for each pixel of display frame 435 represented in block 526-12 of display frame 435 that had an exceptional value before being clamped. As block 526-12 of display frame 435 includes pixel values (e.g., clamped display pixel values 415) for each pixel represented by the block, block 526-12 includes a first amount of data represented in FIG. 5 by a shaded area in block 526-12. However, because block 528-12 of exceptional value frame 425 only includes exceptional reference values for each pixel of display frame 435 represented in block 526-12 of display frame 435 that had an exceptional value before being clamped, block 528-12 of exceptional value frame 425 includes a second amount of data that is smaller (e.g., less than) the amount of data stored in block 526-12 of display frame 435. The second amount of data, for example, is represented in FIG. 5 by a second shaded area in block 528-12 that is smaller in area (e.g., size) than the shaded area in block 526-12 of display frame 435.

Figure 6:
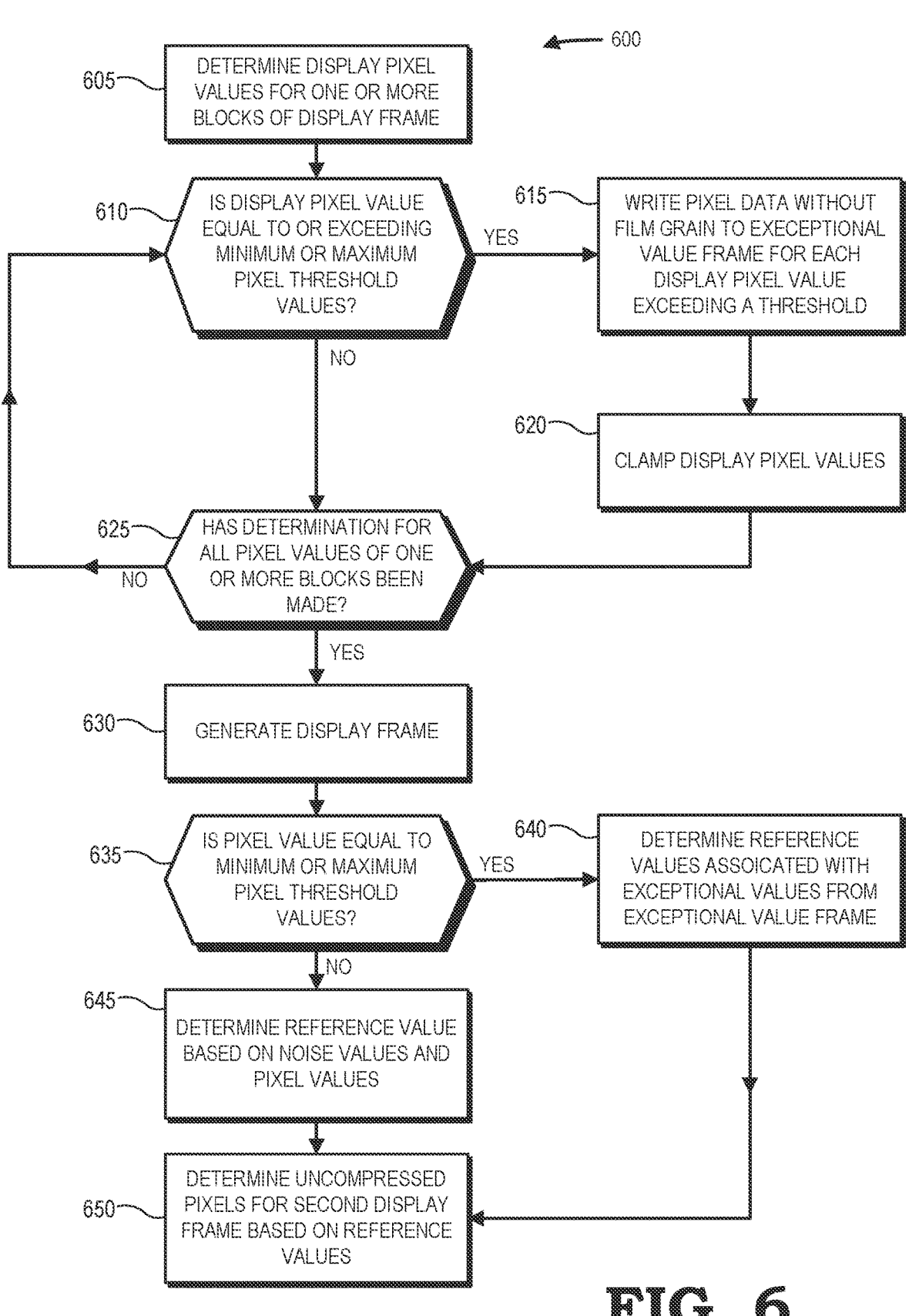
FIG. 6 is a flow diagram of an example method for decoding an encoded frame using an exceptional value frame, in accordance with some embodiments.

Referring now to FIG. 6, an example method 600 for generating an exceptional value frame is presented, according to some embodiments. In some embodiments, example method 600 is implemented by one or more processor cores 116, decoder, 118, noise effect circuitry 120, or any combination thereof of PU 114. At block 605 of example method 600, when decoding a first encoded frame (e.g., encoded frame 108, 205, 405), decoder 118 of PU 114 is configured to generate one or more blocks of display pixel values, similar to or the same as display pixel values 265, 415, for a display frame 130 based on the first encoded frame. For example, decoder 118 initially determines one or more blocks of uncompressed pixel values 255 based on the first encoded frame and then adds one or more respective noise values 225 to each uncompressed pixel value 255 to determine one or more blocks of display pixel values. At block 610, for each display pixel value of one or more blocks of a display frame, decoder 118 is configured to determine whether the display pixel value is equal to or greater than a maximum pixel value of a pixel value range (e.g., maximum pixel value threshold) associated with the display frames 130 (e.g., a range based on the bit-range associated with the display frames 130), is equal to or less than a minimum pixel value of the pixel value range (e.g., a minimum pixel value threshold) associated with the display frames 130, or both. That is to say, decoder 118 determines whether the determined display pixel value includes an exceptional value (e.g., a value greater than the maximum pixel value threshold or less than the minimum pixel value threshold). In response to the determined display pixel value being equal to or greater than the maximum pixel value threshold (e.g., the maximum pixel value of the pixel value range) or being equal to or less than the minimum pixel value threshold (e.g., the minimum pixel value of the pixel value range), PU 114 moves to block 615. At block 615, decoder 118 is configured to write an exceptional pixel value to one or more blocks of an exceptional value frame 425. An exceptional pixel value includes, for example, the display pixel value having an exceptional value without a noise-based effect applied. That is to say, for example, an exceptional pixel value includes a display pixel value less one or more respective noise values 225 (e.g., noise values 225 applied to an uncompressed pixel value 255 to determine the display pixel value). After writing the exceptional pixel value to one or more blocks of exceptional value frame 425, PU 114 moves to block 620. At block 620, decoder 118 clamps the determined display pixel value such that the determined display pixel value is within the pixel value range. That is to say, decoder 118 clamps the determined display pixel value such that the determined display pixel value is equal to or between the minimum pixel value threshold (e.g., the minimum pixel value of the pixel value range) and the maximum pixel value threshold (e.g., the maximum pixel value of the pixel value range). The PU 114 then moves to block 625.

Additionally, referring to block 610, in response the determined pixel value not being equal to or greater than the maximum pixel value threshold (e.g., the maximum pixel value of the pixel value range) and not being equal to or less than the minimum pixel value threshold (e.g., the minimum pixel value of the pixel value range), PU 114 moves to block 625. At block 625, decoder 118 determines if PU 114 has made a determination of whether a determined display pixel value is equal to or greater than the maximum pixel value threshold or is equal to or less than the minimum pixel value threshold for each determined pixel value determined at block 605. That is to say, whether PU 114 has determined if each determined display pixel value of the display frame includes an exceptional value. In response to PU 114 not having made a determination of whether a pixel value is equal to or greater than the maximum pixel value threshold or is equal to or less than the minimum pixel value threshold for each determined display pixel value of the display frame, PU 114 moves on to a next determined display pixel and repeats block 610. In response to PU 114 having made a determination of whether a pixel value is equal to or greater than the maximum pixel value threshold or is equal to or less than the minimum pixel value threshold for each determined display pixel value of the display frame, PU 114 generates a display frame using the clamped pixel values at block 630.

At block 635, PU 114 is configured to decode a second encoded frame based on a previously displayed display frame 130. For example, PU 114 is configured to decode the second encoded frame using the most recently displayed display frame 130. To this end, noise effect circuitry 120 of PU 114 is first configured to determine, for each pixel value of one or more blocks of a previously displayed display frame 130 (e.g., the most recently displayed display frame 130), whether the pixel value is equal to the maximum pixel value threshold (e.g., the maximum pixel value of the pixel value range) or the minimum pixel value threshold (e.g., the minimum pixel value of the pixel value range). In response to the pixel value being equal to the minimum pixel value threshold or the maximum pixel value threshold, PU 114 moves to block 640. At block 640, noise effect circuitry 120 determines a reference value, similar to or the same as a reference value 305, from the exceptional value frame 425. For example, noise effect circuitry 120 generates a reference value equal to a value stored in exceptional value frame 425. As another example, from the exceptional value frame 425, noise effect circuitry 120 identifies a reference value (e.g., value) stored in exceptional value frame 425 that is associated with the same pixel of a display frame 130 as the pixel value equal to the minimum pixel value threshold or the maximum pixel value threshold.

Further, referring again to block 635, in response to a pixel value of the previously displayed display frame 130 not being equal to the minimum pixel value threshold or the maximum pixel value threshold, PU 114 moves to block 645. At block 645, noise effect circuitry 120 determines a reference value by, for example, subtracting a respective noise value from the display pixel value. As an example, noise effect circuitry 120 first generates one or more noise values, by, for example, performing one or more noise effect estimation algorithms, noise effect synthesis algorithms, noise effect modeling algorithms, or any combination thereof based on one or more anoise effect parameters 110. Noise effect circuitry 120 then subtracts a respective determined noise value from the pixel value to determine a reference value for a pixel of the display frame. At block 650, decoder 118 decodes at least a portion of the second encoded frame based on the reference value determined by noise effect circuitry 120 (e.g., the reference value determined at block 640, 635). As an example, decoder 118 combines a compressed pixel value of the second encoded frame with the determined reference value to generate an uncompressed pixel value (e.g., uncompressed pixel value 255). According to some embodiments, PU 114 is configured to perform block 650 after PU 114 has determined whether each pixel value of one or more blocks of the display frame is equal to the minimum or maximum pixel threshold values.

Figure 7:
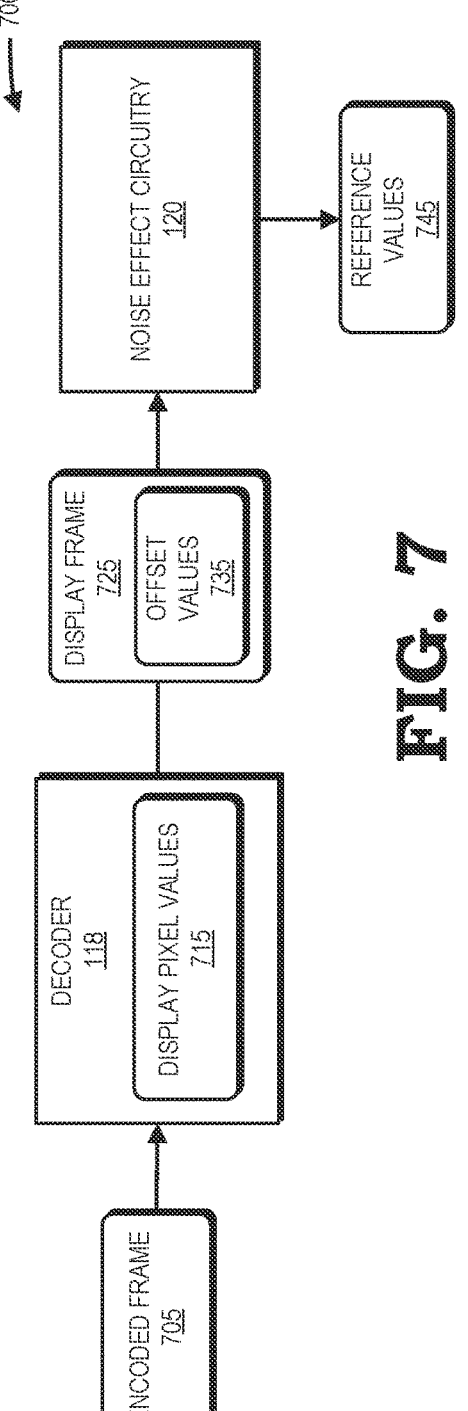
FIG. 7 is a flow diagram of an example operation for generating offset values for one or more reference values, in accordance with some embodiments.

Referring now to FIG. 7, an example operation 700 for generating reference offset values for one or more reference values is presented, in accordance with some embodiments. In embodiments, example operation 700 is implemented in example operation 300 by at least a portion of processing system 100. Example operation 700 first includes a decoder 118 decoding an encoded frame 705 similar to or the same as an encoded frame 108, 405. For example, according to some embodiments, decoder 118 is configured to decode the encoded frame 705 as described in example operation 300. When decoding encoded frame 705, decoder 118 is configured to generate one or more display pixel values 715. For example, to generate such display pixel values 715, decoder 118 is configured to determine one or more uncompressed pixel values 255 based on the encoded frame 705 and one or more reference values 305. Additionally, to generate one or more display pixel values 715, noise effect circuitry 120 is configured to generate one or more noise values 225 based on, for example, one or more noise effect parameters 110. Decoder 118 then adds one or more respective noise values 225 to each uncompressed pixel value 255 to generate display pixel values 715, similar to or the same as display pixel values 265, 415.

After determining display pixel values 715, decoder 118 then determines one or more offset values 735 for one or more of the display pixel values 715. As an example, for each display pixel value 715 having a value (e.g., exceptional value) greater than a maximum pixel value of a pixel value range associated with display frames 130 or less than a minimum pixel value of a pixel value range associated with display frames 130, decoder 118 determines a respective offset value 735. Such offset values 735, for example, include a value representing the difference between a display pixel value 715 and the maximum pixel value of the pixel value range or the minimum pixel value of the pixel value range. After the offset values 735 are determined, decoder 118 clamps each display pixel value 715 such that each display pixel value 715 is within the pixel value range associated with the display frames 130. In other words, each display pixel value 715 is between a minimum pixel value and a maximum pixel value associated with the range. Decoder 118 then generates display frame 725, similar to or the same as display frames 130, 435, based on the clamped display pixel values 715 such that display frame 725 includes a respective clamped display pixel value 415 for each pixel of display frame 725.

Further, according to embodiments, decoder 118 is configured to store offset values 735 in display frame 725. For example, in embodiments, for each pixel, display frame 725 includes a pixel value (e.g., clamped display pixel values 715) stored in a number of bits. Additionally, for each pixel of display frame 725 associated with an exceptional value, decoder 118 is configured to store a respective offset value 735 within the same number of bits storing the pixel value for that pixel. That is to say, for each pixel of display frame 725 that was generated from a display pixel value 715 greater than a maximum pixel value of the pixel range or less than the minimum pixel value of the pixel range before being clamped, decoder 118 is configured to store a respective offset value 735 within the same number of bits storing the pixel value for that pixel.

When decoder 118 is decoding a second encoded frame, noise effect circuitry 120 is configured to determine one or more reference values 745 based on display frame 725 (e.g., a previously displayed display frame). To this end, for each pixel value of display frame 725, noise effect circuitry 120 determines whether the pixel value is associated with an offset value 735. For example, noise effect circuitry 120 determines whether the number of bits including a pixel value for display frame 725 also includes an offset value 735. For each pixel value of display frame 725 associated with an offset value 735, a noise effect circuitry first determines an initial reference value by subtracting a respective noise value from the pixel value. Such noise values, for example, are generated by noise effect circuitry 120 performing one or more noise effect estimation algorithms, noise effect synthesis algorithms, noise effect modeling algorithms, or any combination thereof using one or more noise effect parameters 110. After determining an initial reference value from the pixel value of the display frame 130, noise effect circuitry 120 then adjusts the initial reference value based on the offset value 735 associated with the pixel value of the display frame 130. As an example, noise effect circuitry 120 adds an associated offset value 735 to an initial reference value to produce a reference value 745, similar to or the same as reference values 305, 445. For each pixel value of display frame 725 not associated with an offset value 735, a noise effect circuitry determines a reference value 745 by subtracting a respective noise value from the pixel value.

Figure 8:
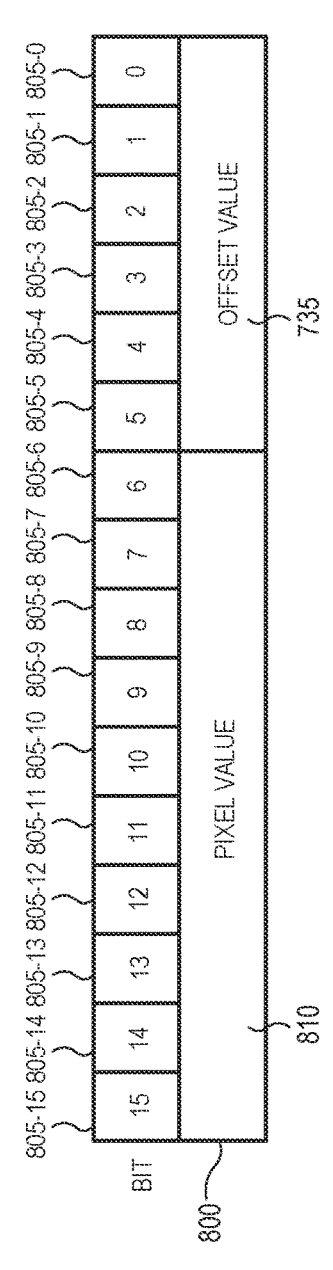
FIG. 8 is a diagram of a number of bits including a reference value and an offset value, in accordance with some embodiments.

FIG. 8 is a diagram of a number of bits 800 including a display pixel value and a reference offset value, in accordance with some embodiments. According to some embodiments, a respective number of bits 800 stores the pixel values for each pixel of a display frame 130, 245, 435, 725. The number of bits 800 includes one or more bits 805 configured to store data indicating a pixel value 810 of a pixel of a display frame, an offset value 735 associated with the pixel value 810, or both. Though the example embodiment of FIG. 8 presents the number of bits 800 as included 16 bits (805-0, 805-1, 805-2, 805-3, 805-4, 805-5, 805-6, 805-7, 805-8, 805-9, 805-10, 805-11, 805-12, 805-13, 805-14, 805-15), in other embodiments, the number of bits 800 can include any amount of bits 805. According to embodiments, a first set of bits 805 of the number of bits 800 is configured to store data indicating a pixel value 810 of a display frame. As an example, in the example embodiment of FIG. 8, a first set of ten bits 805-6 to 805-15 is configured to store data indicating a pixel value 810. Further, a second set of bits 805 is configured to store an offset value 735 associated with the pixel value 810 (e.g., an offset value 735 generated from the same display pixel values 715 as the pixel value 810). In this way, a display frame is configured to store offset values 735 along with one or more pixel values, allowing processing system 100 to accommodate exceptional values when displaying pixel values.

Figure 9:
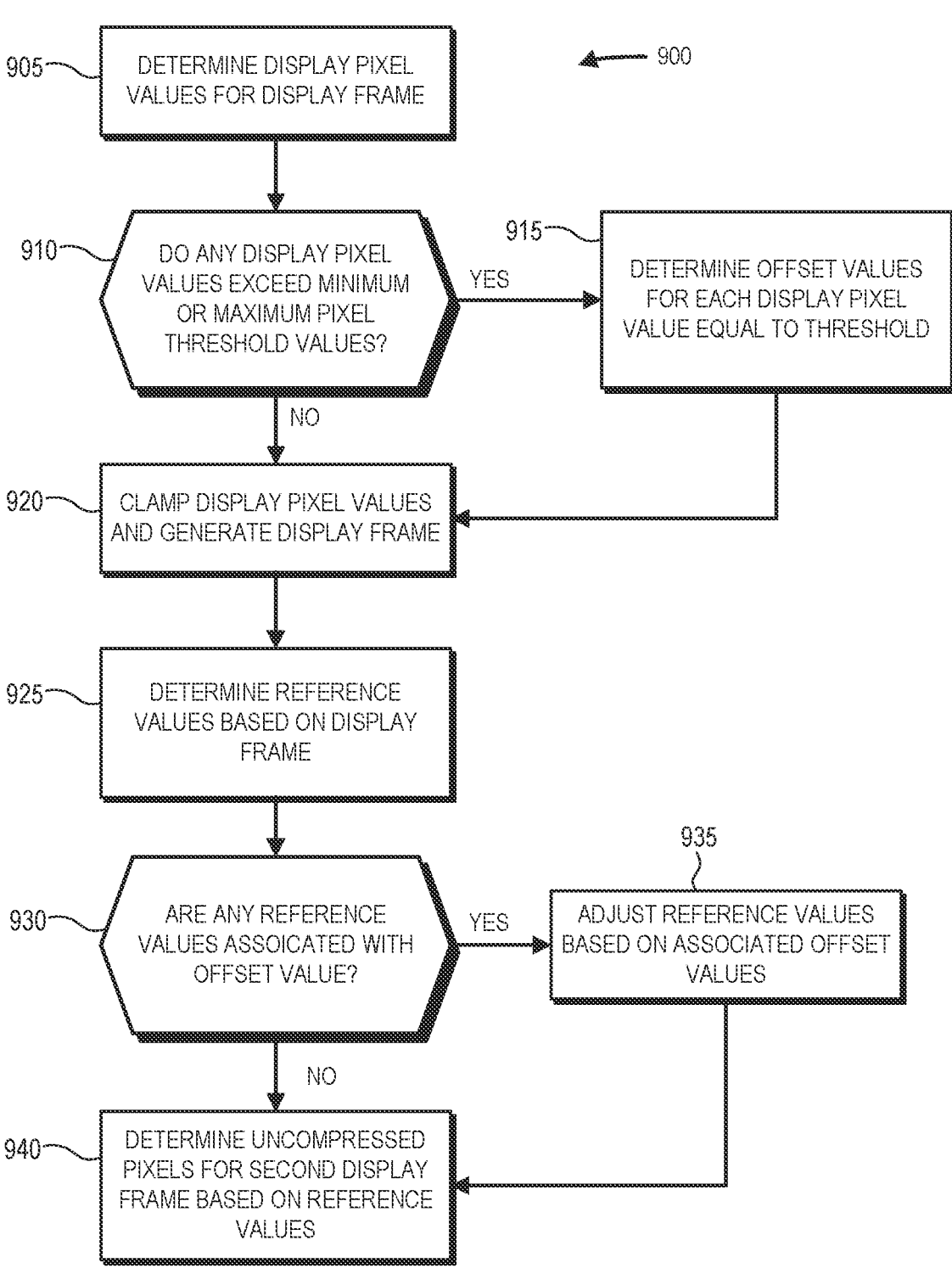
FIG. 9 is a flow diagram of an example method for decoding an encoded frame using one or more offset values, in accordance with some embodiments.

Referring now to FIG. 9, an example method 900 for decoding an encoded frame based on one or more offset values is presented, according to some embodiments. In some embodiments, example method 900 is implemented by one or more processor cores 116, decoder, 118, noise effect circuitry 120, or any combination thereof of PU 114. At block 905 of example method 900, when decoding a first encoded frame (e.g., encoded frame 108, 205, 405), decoder 118 of PU 114 is configured to generate one or more blocks of display pixel values, similar to or the same as display pixel values 265, 415, 715 for a display frame 130 based on the first encoded frame. For example, decoder 118 determines one or more blocks of uncompressed pixel values 255 based on the first encoded frame and adds one or more respective noise values 225 to each uncompressed pixel value 255 to determine one or more blocks of display pixel values. At block 910, decoder 118 is configured to determine whether any of the determined display pixel values of one or more blocks are greater than a maximum pixel value of a pixel value range (e.g., maximum pixel value threshold) associated with the display frames 130 (e.g., a range based on the bit-range associated with the display frames 130), are less than a minimum pixel value of the pixel value range (e.g., a minimum pixel value threshold) associated with the display frames 130, or both. That is to say, decoder 118 determines whether any of the determined display pixel values of one or more blocks include an exceptional value (e.g., a value greater than the maximum pixel value threshold or less than the minimum pixel value threshold). In response to one or more of the determined display pixel values being greater than the maximum pixel value threshold (e.g., the maximum pixel value of the pixel value range) or being less than the minimum pixel value threshold (e.g., the minimum pixel value of the pixel value range), PU 114 moves to block 915. At block 915, for each determined display pixel value that is greater than the maximum pixel value threshold or less than the minimum pixel value threshold (e.g., for each determined pixel display value having an exceptional value), decoder 118 is configured to generate a respective offset value 735. Such an offset value 735, for example, includes a value representing the difference between a display pixel value (e.g., a display pixel value having an exceptional value) and the maximum pixel value threshold or the minimum pixel value threshold. For example, in response to a display pixel value being greater than the maximum pixel value threshold, an offset value 735 includes a value representing the difference between the display pixel value and the maximum pixel value threshold. As another example, in response to a display pixel value being less than the minimum pixel value threshold, an offset value 735 includes a value representing the difference between the display pixel value and the minimum pixel value threshold. After determining offset values 735 for each determined display pixel value that is greater than the maximum pixel value threshold or less than the minimum pixel value threshold, PU 114 moves to block 920.

Additionally, referring again to block 910, in response to none of the determined display pixel values being equal to or greater than the maximum pixel value threshold (e.g., the maximum pixel value of the pixel value range) or being equal to or less than the minimum pixel value threshold (e.g., the minimum pixel value of the pixel value range), PU 114 moves to block 920. At block 920, decoder 118 clamps the determined display pixel values such that the determined display pixel values are within the pixel value range. That is to say, decoder 118 clamps the determined display pixel values such that the determined display pixel values are equal to or between the minimum pixel value threshold (e.g., the minimum pixel value of the pixel value range) and the maximum pixel value threshold (e.g., the maximum pixel value of the pixel value range). After clamping the determined display pixel values, decoder 118 generates a display frame 130 that includes the clamped display pixel values and offset values 735 and stores the display frame 130 in memory 106.

At block 925, PU 114 is configured to decode a second encoded frame based on a previously displayed display frame 130. For example, PU 114 is configured to decode the second encoded frame using the most recently displayed display frame 130. To this end, noise effect circuitry 120 of PU 114 is configured to generate a reference value for each pixel of the previously displayed display frame 130. For example, noise effect circuitry 120 performs one or more noise effect estimation algorithms, noise effect synthesis algorithms, noise effect modeling algorithms, or any combination thereof using one or more a noise effect parameters 110 to determine one or more noise values (e.g., a noise-based effect) that were applied to the previously displayed display frame 130. Noise effect circuitry 120 then subtracts a respective noise value from each pixel value (e.g., pixel value 810) of the previously displayed display frame 130 to determine a reference value. At block 930, noise effect circuitry 120 determines whether one or more of the reference values are associated with a respective offset value 735. That is to say, whether one or more reference values were generated from a pixel value associated with an offset value 735 (e.g., a pixel value stored in a same number of bits as an offset value 735). In response to one or more reference values being associated with an offset value 735, PU 114 moves to block 935. At block 935, noise effect circuitry 120 adjusts each reference value associated with an offset value 735 based on the associated offset value 735. For example, noise effect circuitry 120 adds a respective offset value 735 to each reference value associated with an offset value. After adjusting each reference value associated with an offset value, PU 114 moves to block 940.

Referring again to block 930, in response to none of the reference values being associated with an offset value 735, PU 114 moves to block 940. At block 940, decoder 118 decodes the second encoded frame based on the reference values (e.g., adjusted reference values). As an example, decoder 118 combines one or more compressed pixel values of the second encoded frame to one or more determined reference values (e.g., adjusted reference values) to generate one or more uncompressed pixel values (e.g., uncompressed pixel values 255).

In some embodiments, the apparatus and techniques described above are implemented in a system including one or more integrated circuit (IC) devices (also referred to as integrated circuit packages or microchips), such as the PU described above with reference to FIGS. 1-9. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processing unit (PU), comprising:
decoder circuitry configured to clamp a pixel value of a first display frame having a noise-based effect in response to the pixel value being equal to or greater than a maximum pixel value threshold or equal to or less than a minimum pixel value threshold; and
noise effect circuitry configured to generate a plurality of reference values based on a difference between each noise value of a plurality of noise values associated with the first display frame with the noise-based effect and a corresponding pixel value of the first display frame with the noise-based effect, wherein the decoder circuitry is configured to decode an encoded frame based on the plurality of reference values to produce a second display frame with the noise- based effect.

2. The PU of claim 1, wherein the noise effect circuitry is configured to:
generate a second plurality of reference values based on a second plurality of noise values associated with the second display frame.

3. The PU of claim 1, wherein the noise effect circuitry is configured to:
in response to the pixel value of the first display frame with the noise-based effect being equal to or greater than a maximum pixel value threshold or equal to or less than a minimum pixel value threshold, write a value representing the pixel value without the noise-based effect to a frame.

4. The PU of claim 3, wherein the decoder circuitry is configured to:
determine a reference value of the plurality of reference values based on the value in the frame.

5. The PU of claim 1, wherein the noise effect circuitry is configured to:
in response to a pixel value associated with the first display frame with the noise-based effect being greater than a maximum pixel value threshold or less than a minimum pixel value threshold, determine an offset value representing a difference between the pixel value associated with the first display frame and the maximum pixel value threshold or the minimum pixel value threshold.

6. The PU of claim 5, wherein the first display frame includes the offset value.

7. The PU of claim 1, wherein the noise-based effect comprises at least one selected from a group of film grain, dithering, and debanding.

8. A processing system, comprising:
a memory storing one or more noise effect parameters associated with an encoded frame; and
a processing unit (PU) coupled to the memory and including:
decoder circuitry configured to clamp a pixel value of a first display frame having a noise-based effect in response to the pixel value being equal to or greater than a maximum pixel value threshold or equal to or less than a minimum pixel value threshold; and
noise effect circuitry configured to:
determine a plurality of noise values associated with the first display frame with the noise-based effect based on the one or more noise effect parameters; and
generate a plurality of reference values based on the plurality of noise values associated with the first display frame with the noise-based effect,
wherein the decoder circuitry is configured to decode the encoded frame based on the plurality of reference values to produce a second display frame with the noise-based effect.

9. The processing system of claim 8, wherein the PU is configured to:
generate a second plurality of reference values based on a second plurality of noise values associated with the second display frame.

10. The processing system of claim 8, wherein the PU is configured to:
in response to the pixel value associated with the first display frame with the noise-based effect being equal to or greater than a maximum pixel value threshold or equal to or less than a minimum pixel value threshold, write a value representing the pixel value without the noise-based effect to a frame.

11. The processing system of claim 10, wherein the PU is configured to:

determine a reference value of the plurality of reference values based on the value in the frame.

12. The processing system of claim 8, wherein the PU is configured to:

in response to a pixel value associated with the first display frame having the noise-based effect being greater than a maximum pixel value threshold or a minimum pixel value threshold, determine an offset value representing a difference between the pixel value associated with the first display frame and the maximum pixel value threshold or the minimum pixel value threshold.

13. The processing system of claim 12, wherein the first display frame includes the offset value.

14. The processing system of claim 8, wherein the noise-based effect comprises at least one selected from a group of film grain, dithering, and debanding.

15. A method, comprising:

clamping, by a processing unit, a pixel value of a first display frame having a noise-based effect in response to the pixel value being equal to or greater than a maximum pixel value threshold or equal to or less than a minimum pixel value threshold;

generating, by the processing unit, a plurality of reference values based on a difference between each noise value of a plurality of noise values associated with the first display frame with the noise-based effect and a corresponding pixel value of the first display frame with the noise-based effect; and decoding, by a decoder circuitry of the processing unit, an encoded frame based on the plurality of reference values to produce a second display frame with the noise- based effect.

16. The method of claim 15, further comprising:

generating a second plurality of reference values based on a second plurality of noise values associated with the second display frame.

17. The method of claim 15, further comprising:

in response to the pixel value associated with the first display frame with the noise-based effect being equal to or greater than a maximum pixel value threshold or equal to or less than a minimum pixel value threshold, writing a value representing the pixel value without the noise-based effect to a frame.

18. The method of claim 17, further comprising:

determining a reference value of the plurality of reference values based on the value in the frame.

19. The method of claim 15, further comprising:

in response to a pixel value associated with the first display frame with the noise-based effect being greater than a maximum pixel value threshold or less than a minimum pixel value threshold, determining an offset value representing a difference between the pixel value associated with the first display frame and the maximum pixel value threshold or the minimum pixel value threshold.

20. The method of claim 19, wherein the first display frame includes the offset value.

* * * * *